US012251953B2

(12) United States Patent
Clement

(10) Patent No.: US 12,251,953 B2
(45) Date of Patent: Mar. 18, 2025

(54) COMPOSITION FOR USE IN A METHOD FOR MANUFACTURING PAPER PRINTABLE WITH AN INKJET PRINTER FOR USE AS A DECOR PAPER

(71) Applicant: Unilin, BV, Wielsbeke (BE)

(72) Inventor: Benjamin Clement, Waregem (BE)

(73) Assignee: Unilin, BV, Wielsbeke (BE)

(*) Notice: Subject to any disclaimer, the term of this patent is extended or adjusted under 35 U.S.C. 154(b) by 646 days.

(21) Appl. No.: 17/398,109

(22) Filed: Aug. 10, 2021

(65) Prior Publication Data

US 2021/0362528 A1 Nov. 25, 2021

Related U.S. Application Data

(63) Continuation of application No. 16/704,417, filed on Dec. 5, 2019, now Pat. No. 11,117,410, which is a (Continued)

(30) Foreign Application Priority Data

Jan. 26, 2016 (EP) .................................... 16152800

(51) Int. Cl.
*B41M 5/50* (2006.01)
*B41J 3/407* (2006.01)
(Continued)

(52) U.S. Cl.
CPC .............. *B41M 5/506* (2013.01); *B41J 3/407* (2013.01); *B41J 11/0015* (2013.01);
(Continued)

(58) Field of Classification Search
CPC ........ B41M 5/506; B41M 5/508; B41M 5/52; B41M 5/5218; B41M 5/5254;
(Continued)

(56) References Cited

U.S. PATENT DOCUMENTS

| | | | |
|---|---|---|---|
| 4,316,351 | A | 2/1982 | Ting |
| 6,372,329 | B1 | 4/2002 | Graczyk et al. |

(Continued)

FOREIGN PATENT DOCUMENTS

| | | | |
|---|---|---|---|
| DE | 19725829 | C1 | 8/1998 |
| EP | 1044822 | A1 | 10/2000 |

(Continued)

*Primary Examiner* — Betelhem Shewareged
(74) *Attorney, Agent, or Firm* — Capitol City TechLaw

(57) ABSTRACT

A composition may be provided for use in a method for manufacturing a paper layer printable with an inkjet printer. The paper layer may be used as a decor paper in a laminate panel. At least one side of the paper layer may be coated with an inkjet receiver coating in at least two partial steps. A first layer of a first composition may be applied, and subsequently a second layer of a second composition may be applied. The first and the second compositions may at least include a binder. Each of the first and the second compositions may include a liquid substance being a water-based suspension of at least the binder. A dry matter content of the first composition may be of 8 to 25 percent by weight of the liquid substance, and/or a dry matter content of the second composition may be of 4 to 20 percent by weight of the liquid substance.

17 Claims, 3 Drawing Sheets

Related U.S. Application Data continuation of application No. 16/070,488, filed as application No. PCT/IB2017/050392 on Jan. 25, 2017, now Pat. No. 10,532,597.

(51) Int. Cl.

| | |
|---|---|
| ***B41J 11/00*** | (2006.01) |
| ***B41M 5/52*** | (2006.01) |
| *B44C 5/04* | (2006.01) |

(52) U.S. Cl.

CPC .............. *B41M 5/508* (2013.01); *B41M 5/52* (2013.01); *B41M 5/5218* (2013.01); *B41M 5/5254* (2013.01); *B41M 2205/38* (2013.01); *B41M 2205/42* (2013.01); *B44C 5/04* (2013.01)

(58) Field of Classification Search

CPC ........... B41M 2205/38; B41M 2205/42; B41J 3/407; B41J 11/0015

USPC ....................................................... 428/32.24

See application file for complete search history.

(56) References Cited

U.S. PATENT DOCUMENTS

| | | | | |
|---|---|---|---|---|
| 10,532,597 | B2 | 1/2020 | Clement | |
| 11,117,410 | B2 | 9/2021 | Clement | |
| 2003/0219553 | A1 | 11/2003 | Graindourze | |
| 2008/0241438 | A1* | 10/2008 | Nakano | B41M 5/502 427/180 |
| 2008/0261021 | A1* | 10/2008 | Haenen | B41M 5/502 428/537.5 |
| 2009/0123655 | A1 | 5/2009 | Shaw-Klein et al. | |
| 2009/0136692 | A1* | 5/2009 | Takahashi | B41M 5/506 427/256 |
| 2009/0219374 | A1 | 9/2009 | Kaimoto | |
| 2010/0033527 | A1* | 2/2010 | Kawakami | B41M 5/52 347/16 |
| 2010/0075045 | A1* | 3/2010 | Kaimoto | B41M 5/502 427/256 |
| 2011/0039043 | A1* | 2/2011 | Klemann | B41M 5/502 428/32.37 |
| 2016/0207307 | A1 | 7/2016 | De Mondt et al. | |
| 2021/0362528 | A1* | 11/2021 | Clement | B41M 5/5254 |

FOREIGN PATENT DOCUMENTS

| | | | |
|---|---|---|---|
| EP | 1290290 | B1 | 3/2003 |
| EP | 1343943 | B1 | 9/2003 |
| EP | 1493866 | A1 | 1/2005 |
| EP | 1749676 | A1 | 2/2007 |
| EP | 1857511 | A1 | 11/2007 |
| EP | 1872959 | A1 | 1/2008 |
| EP | 2132041 | B1 | 12/2009 |
| EP | 2274485 | B1 | 1/2011 |
| EP | 2293946 | B1 | 3/2011 |
| EP | 2431190 | A2 | 3/2012 |
| EP | 2894047 | A1 | 7/2015 |
| EP | 2905376 | A1 | 8/2015 |
| EP | 3199360 | B1 | 8/2017 |
| FR | 2459335 | A1 | 1/1981 |
| GB | 2380695 | A | 4/2003 |
| JP | 2006-45694 | A | 2/2006 |
| JP | 2015-221497 | A | 12/2015 |
| RU | 2328378 | C2 | 1/2008 |
| WO | 2007099281 | A1 | 9/2007 |
| WO | 2009061351 | A1 | 5/2009 |
| WO | 2011124503 | A2 | 10/2011 |
| WO | 2015104652 | A1 | 7/2015 |
| WO | 2015118451 | A1 | 8/2015 |
| WO | 2017130117 | A1 | 8/2017 |

* cited by examiner

COMPOSITION FOR USE IN A METHOD FOR MANUFACTURING PAPER PRINTABLE WITH AN INKJET PRINTER FOR USE AS A DECOR PAPER

This application is a continuation application of U.S. patent application Ser. No. 16/704,417 filed Dec. 5, 2019, which is a continuation application of U.S. patent application Ser. No. 16/070,488 filed Jul. 16, 2018 (issued as U.S. Pat. No. 10,532,597 on Jan. 14, 2020), which is a US National Phase Application of International Application No. PCT/IB2017/050392 filed Jan. 25, 2017, the entire contents of all three of which are incorporated herein by reference.

This application claims priority under 35 USC § 119(a)-(d) to EP patent application No. 16152800.5, which was filed on Jan. 26, 2016, the entire contents of which are incorporated herein by reference.

BACKGROUND

1. Field

The present invention relates to a method for manufacturing panels having a decorative surface, or, so-called decorative panels. The invention also relates to a method for manufacturing paper printable with inkjet for use as a decor paper in such panels and to the paper obtainable with such method.

More particularly the invention is related to a method for manufacturing laminate panels, wherein said panels at least comprise a substrate material and a provided thereon top layer with a printed decor. The top layer is formed from thermosetting resin and one or more paper layers, wherein said paper layers comprise a decor paper having a printed pattern. The panels of the invention may relate to furniture panels, ceiling panels, flooring panels or similar, wherein these panels preferably comprise a wood based substrate, such as an MDF or HDF substrate (Medium or High Density Fiberboard) or a substrate material consisting of or essentially made of wood particleboard.

2. Related Art

Traditionally, the decor or pattern of such panels is printed on paper by means of offset or rotogravure printing. The obtained paper is taken up as a decorative paper in a so called laminate panel. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to the EP 1 290 290, from which it is further known to provide a relief in said melamine surface during the same press treatment or pressing operation, namely by bringing said melamine surface in contact with a structured press element, for example a structured press plate.

The printing of paper by means of an analog printing process, such as by rotogravure or offset printing, at affordable prices inevitably leads to large minimal order quantities of a particular decorative paper and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Providing the printed paper with resin can lead to expansion of the paper, which is difficult to control. Problems can arise, particularly in the cases where, like in the EP 1 290 290, a correspondence between the relief and the printed decor is desired.

With the aim of restricting the costs of decorative paper and of preventing expansion, a method is known, for example from the DE 197 25 829 C1, wherein the analog printing process, for example an offset process, is used to print directly on the plate shaped substrate, whether or not with the intermediary of preparatory layers, such as melamine based layers. The printed decor is finished with melamine based layers and the created whole is cured using a pressing operation. Directly printing on the plate may lead to inferior printing quality. Any inhomogeneity internally in the plate or at its surface has a high risk of telegraphing to the upper surface, thereby forming a visual defect at the surface of the finished decorative panel. The printing process furthermore shows the same problems regarding the attainable flexibility, as when printing on paper. Finally, any quality issue on the print will result in loss of valuable board material.

Instead of analog printing techniques, digital printing techniques, especially inkjet printing technique, is becoming increasingly popular for the creation of decors or patterns, be it on paper or directly on a plate-shaped substrate possibly with the intermediary of preparatory layers. Such digital techniques can enhance the flexibility in the printing of decors significantly. Reference is made to the EP 1 872 959, WO 2011/124503, EP 1 857 511, EP 2 431 190, EP 2 293 946 and the WO 2015/118451, where such techniques are disclosed.

EP 2 132 041 discloses a method at least comprising the step of providing said paper layer with thermosetting resin and the step of providing said resin provided paper layer with at least a portion of said printed pattern. Preferably multi color printed patterns are applied for the realization of a decor, e.g. representing a wood pattern, on the abovementioned paper layer. Such decor extends over the majority, or even over the totality of the resin provided paper layer. Such a technique is known as such for example from the EP 2 132 041, where a digital printer, more particularly an inkjet printer is applied. It has however been very difficult to reliably further process such printed paper for manufacturing laminate panels, such as in a DPL process, since pressing defects may originate in the resin surface and milling, drilling or sawing through the laminate surface or at the edge thereof often leads to splitting in the top layer. Furthermore the inks or dyes of the EP'041 may overly wet the paper layer and cause wrinkling effects or bleeding upon further handling of the printed paper, leading to an instable and/or slow production process. To solve this issue the EP'041 propose to immediately dry the printed paper layer.

EP 1 044 822, EP 1 749 676 and EP 2 274 485 disclose the use of an inkjet receiver coating to enhance the printing quality on a raw décor paper. Such inkjet receiver coating comprises pigments and a polymer such as Polyvinyl alcohol.

As recognized in WO 2015/118451 the use of paper treated with an inkjet receiver coating may lead to malfunctioning of the printing equipment. Dust may release from the inkjet receiver coating and bring about all sorts of malicious effects to the critical parts of an inkjet printer. The dust may for example clog one or more of the nozzles and lead to printing faults. WO 2015/118451 proposes to avoid too large a bent in the paper in the printing equipment to minimize the release of dust.

During private research, the inventor has also encountered problems with subsequent impregnation of dust releasing paper layers, even in the cases where the paper layers were already printed upon. The released dust may pollute the resin bath, the rollers, cameras and other equipment in, or in the immediate vicinity of, the impregnation channel, leading to defects in the final product or of the equipment used.

WO 2015/118451 further recognizes that non uniform application of the inkjet receiver coating may lead to unacceptable defects that become visible only after printing. Indeed when the inkjet receiver coating is unevenly applied, the amount of bleeding of the subsequently applied inks may vary in accordance with the distribution of the inkjet receiver coating. Typically zones of lesser print quality will be observed extending in the application direction of the coating. WO 2015/118451 proposes to alleviate this problem by also having the printed wood pattern extend with its wood nerves in the application direction, such that the inadvertent production variation may be mistaken for a natural aspect of the wood grain.

SUMMARY

The present invention aims in the first place at an alternative method for manufacturing panels having a decorative surface or paper for use in such panels, and seeks, in accordance with several of its preferred embodiments, to solve one or more of the problems arising in the state of the art.

Therefore, the present invention, in accordance with its first independent aspect, relates to a method for manufacturing paper printable with an inkjet printer for use as a decor paper in a laminate panel, wherein the method at least comprises the following steps:

- the step of providing a paper layer;
- the step of coating at least one side of said paper layer with an inkjet receiver coating comprising pigment and binder;

with the characteristic that said inkjet receiver coating is applied in at least two partial steps, wherein respectively a first layer with a first composition and, subsequently, a second layer is applied with a second composition, both compositions at least comprising said binder.

The inventor has witnessed that the application of the inkjet receiver coating in two partial steps leads to a better incorporation or binding of the pigment. The risk of dust releasing from the paper is reduced as compared to a situation where the same amount of pigment is applied in only one coating step. According to the inventor this surprising effect is to be attributed to the first layer forming a kind of barrier for the binder of the second layer against penetration in the paper layer. The binder of the second layer is better effective in binding pigments that would otherwise be loose or badly bound on the surface of the paper. The reduction of loose or badly adhered pigments leads to a significant reduction of dust release from the paper upon further handling, e.g. printing, impregnation with resin, thereof.

The application of the inkjet receiver coating in two steps may further lead to a more even application of the entirety of the inkjet receiver coating. Where the first composition may be partly absorbed in the paper layer in a non-uniform manner, and therefor may lead to an uneven first layer, the second composition levels out the possible unevenness at least to some extent.

The method of the invention is especially interesting when it is started from paper layers the mean air resistance of which is low, e.g. with a Gurley value of 30 seconds or below, e.g. 25 seconds or below. In such cases the binder contained in the first layer tends to be largely absorbed in the paper mass, leaving the pigment content largely unbound on the surface. Preferably the paper layer is a standard printing base paper or another untreated paper layer having a mean air resistance as expressed by Gurley value of 30 seconds or lower. It is of course not to be excluded that in the method of the invention, according to an alternative embodiment, it is started from a paper treated with thermosetting resin prior to the application of said inkjet receiving coating. Preferably, in this latter case, the resin provided paper layer has a mean air resistance with a Gurley value of 100 seconds or lower. Also, in such case the application of an inkjet receiver coating in two partial steps has significant advantages, e.g. regarding dust release, the minimization of bleeding of jetted inks, the uniform application of the inkjet receiver coating.

Preferably the paper layer onto which the inkjet receiver coating is applied has a base weight of 50 to 100 grams per square meter, e.g. between 60 and 80 grams per square meter.

Preferably, the side of the paper layer onto which the inkjet receiver coating is to be applied has been smoothened (German: geglättet), preferably during paper production. The smoothening of the paper diminishes the amount of binder of the first composition penetrating the paper's core, such that the pigments contained in the first composition can be better bound by the available binder substance and variations in absorption may be less.

Preferably, the paper obtained using the method of the invention, i.e. including the inkjet receiver coating, has a Gurley value of between 60 and 120 seconds, and preferably between 80 and 100 seconds. Such paper layer results in an excellent printing quality, since the deposited inks tend to bleed less into the paper, and the position accordance, or so-called register, between printed patterns applied with different inkjet heads is more easily attained and maintained. Indeed, a relatively high Gurley value leads to more dimensionally stable paper, since it is less prone to water absorptance. When dealing with the impregnation with thermosetting resin of such a high Gurley value paper one could consider tuning down the speed of the impregnation channel, the use of pressurized impregnation techniques and the lowering of the viscosity of the impregnating resin.

In general, the method of the invention allows to apply an inkjet receiver coating with a higher pigment content and, therefore, a higher capability, or higher speed, of absorbing the vehicle of the applied inks, e.g. water in the case of aqueous pigmented inks, while maintaining or even reducing dust release from the treated printable surface. The higher capability or speed of absorbing the vehicle may lead to a higher print definition. Since the vehicle is absorbed essentially vertically into the inkjet receiving coating, i.e. without substantial sideways bleeding, the pigments are maintained on the spot where the ink was applied, i.e. the pigments are not driven sidewardly along with the vehicle of the ink. As stated above, any bleeding still available may manifest itself in a more even manner due to the application of the second layer of the inkjet receiver coating levelling out partially or wholly the first layer.

According to a preferred embodiment, said first layer and said second layer differ in that they show one or more of the following properties:

1.—the property that said first layer as well as said second layer comprise pigment and binder, albeit in a different pigment to binder ratio;
2.—the property that the dry weight of material applied for said first layer and said second layer is different;
3.—the property that said first layer as well as said second layer comprise pigment and binder, wherein the average particle size of the pigments contained in said first layer is different, preferably larger, than the average particle size contained in said second layer.

Regarding the first mentioned property, preferably said first composition has a pigment to binder ratio which is larger than the pigment to binder ratio of said second composition. In this way the binder of the second layer primarily binds the pigments of the first layer and levels out unevenness in the first layer.

Preferably the pigment to binder ratio in said second composition is lower than 2:1, and preferably lays between 0.2:1 and 2:1. When the ratio in the second composition is below 1.5:1 an extremely low dust release has been witnessed.

Whether or not in combination with the mentioned preferred second composition, the pigment to binder ratio in said first composition may be chosen between 1:1 and 10:1 or 2:1 and 10:1, and is preferably 3.5:1 or larger than 3.5:1, and even better 5.5:1 or larger than 5.5:1, though preferably smaller than 7:1.

A good combination of the first and second composition is reached when the ratio pigment to binder in the second composition is between 0.2:1 and 2:1 and the ratio pigment to binder in the first composition is between and including 3.5:1 and 7:1.

Regarding the second mentioned property, it is of course not excluded that for both layers the same dry weight would be applied. In such case, however, preferably a different pigment to binder ratio is applied in the first and second composition. Preferably for both layers a dry weight of between 5 and 20 grams per square meter of material is applied to the paper layer, and even better between 8 and 18 grams per square meter. In the cases where the dry weight of material applied for said first layer and said second layer is different, preferably the first layer includes the highest dry weight of material, e.g. at least 20% more than the second layer.

Regarding the third mentioned property, the larger pigment particles are preferably contained in said first composition. The use of large particles in the first layer provides for an excellent absorption of the inks vehicle, while the use of small particles in the second layer provides for a levelling out effect and a good reduction of dust release at the surface of the paper layer. Preferably, in such case, the pigment particles in said first composition have an average particle size between 1 and 20 micrometer. Preferably the pigment particles in said second composition have an average particle size between 100 nanometer and 1 micrometer.

According to the most preferred embodiment, for the pigment of said inkjet receiver coating at least or mainly silica particles are used, and/or for said binder at least or mainly polyvinyl alcohol is used. Preferably the silica particles are silane treated. Silane treatment of the pigments further enhances dust release properties of the attained inkjet receiver coating and thus treated paper. The silane treatment may relate to a treatment with a coupling agent such as amino-organo-silanes, hydroxysilanes, dipodal silanes and/or other silanes. Preferably the coupling agent is chosen such that the risk of yellowing upon aging of the attained inkjet receiver coating is low. Preferably, the coupling agent forms 0.1 to 10% of the total wet weight of the first and/or second composition.

According to variants, the inkjet receiving layer includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

As stated above preferred binders for the inkjet receiving layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

The binder comprised in the first and/or the second composition may also be formed by a mixture of the above listed possibilities for such binder. According to a special embodiment a mixture of polyvinyl alcohol with ethylene vinyl acetate (EVA) and/or polyvinyl acetate (PVAc) is used as a binder, wherein preferably the main constituent of the binder is polyvinyl alcohol and, e.g. at least 5% by weight of EVA and/or PVAc is used. The inventor has recorded an increased flexibility of the thus treated papers as compared to papers where the binder is essentially polyvinyl alcohol. Similar effects may be attained with the addition of, e.g. at least 5% by weight, vinyl-acetate-ethylene (VAE) and/or vinylester ethylene. An increased flexibility with diminished dust release is advantageous in further handling of the thus treated paper, e.g. in the printing equipment.

Preferably, the binder in the first and the second composition is the same, or, at least the main constituent of the binder is the same. As stated before, the main constituent is preferably polyvinyl alcohol.

As a pigment in the first and/or second composition, any inorganic pigment and most preferably a porous inorganic pigment may in fact be used. Mixtures of two or more pigments may also be used. The pigment used is preferably an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides. The inorganic pigment is preferably selected from the group consisting of alumina hydrates, aluminum oxides, aluminum hydroxides, aluminum silicates, and silicas. Particularly preferred inorganic pigments are silica particles, colloidal silica, alumina particles and pseudo-boehmite, as they form better porous structures. When used herein, the particles may be primary particles directly used as they are, or they may form secondary particles. A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH. Useful cationic aluminum oxide (alumina) types include $\alpha$-$Al_2O_3$ types, such as NORTON E700, available from Saint-Gobain Ceramics & Plastics, Inc, and $\gamma$-$Al_2O_3$ types, such as ALUMINUM OXID C from Degussa. Other useful inorganic pigments include aluminum trihydroxides such as Bayerite, or α-Al(OH)3, such as PLURAL BT, available from Sasol, and Gibbsite, or γ-Al(OH)3, such as MARTINAL grades and MARTIFIN grades from Martinswerk GmbH, MICRAL grades from JM Huber company; HIGILITE grades from Showa Denka K.K. As stated before, the preferred type of inorganic pigment is silica which can be used as such, in its anionic form or after cationic modification. The silica can be chosen from different types, such as crystalline silica, amorphous silica, precipitated silica, fumed silica, silica gel, spherical and non-spherical silica. The silica may contain minor amounts of metal oxides from the group Al, Zr, Ti. Generally depending on their production method, silica particles are grouped into two types, wet-process particles and dry-process (vapour phase-process or fumed) particles. In the wet process, active silica is formed through acidolysis of silicates, and this is polymerized to a suitable degree and flocculated to obtain hydrous silica. A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles preferably used in the inkjet receiving layer of the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high.

Alternatively, organic pigments may be used in the optional inkjet receiving layer, preferably chosen from the list consisting of polystyrene, polymethyl methacrylate, silicones, melamine-formaldehyde condensation polymers, urea-formaldehyde condensation polymers, polyesters and polyamides. Mixtures of inorganic and organic pigments can be used. However, most preferably the pigment is an inorganic pigment.

Preferably the pigments included in the inkjet receiving layer have an average particle size of 100 nm to 20 μm, wherein 1-12 μm, and even better 2 to 7 μm is ideal. Small particle size pigments can be easily bound to the paper, while large particle size pigments show great water absorbency, thereby leading to a good printing quality. The optimum average particle size is in the range between 1 and 12 μm, preferably 2 to 7 μm.

Preferably the pigments included in the inkjet receiving layer have an average surface area of 20 to 420 $m^2/g$ and preferably between 300 and 420 $m^2/g$, in order to obtain a good absorbency of the ink vehicle.

Preferably the pigments included in the inkjet receiving layer have an average pore volume of 0.5 to 2 ml/g, preferably between 1 and 2 ml/g.

Pigments having an average particle size between 2 and 7 μm, an average surface area of 300 to 420 $m^2/g$ and an average pore volume between 1 and 2 ml/g give an ideal combination of absorbing capability, print quality and binding, i.e. the lack of dust release from the treated paper.

Preferably the inkjet receiver coating either in said first composition or in said second composition or in both the first and the second composition, further comprises a cross-linker, preferably chosen from the list consisting of aldehydes, aziridines, isocyanates, epoxides and borates. Such cross-linker further binds the pigments in the inkjet receiver coating and further limits dust release from the thus printed paper. The availability of cross-linker in either of the compositions further increases the pot life of the relevant composition significantly. Preferably the first and/or the second composition comprise cross-linkers in an amount making up 0.1 to 10% of the total wet weight of the first and/or second composition.

The first and/or the second composition may further comprise additives other than cross-linkers in a total amount making up 0.1 to 2% of the total wet weight of the first and second composition respectively. Such additives may be one or more of anti-foaming agent, levelling agent, wetting agent such as alkyl phenol ethoxylates, thickeners such as hydroxyl ethyl cellulose or xanthane gum, pH adjusters such as NaOH, KOH, $NH_3$, $HNO_3$ or $H_2SO$, cationic additives such as polydadmac, preservatives and/or dispersing agents such as acrylates, polyphosphates or natrium aluminates.

For the levelling agent use could be made of APEO (alkyl phenol ethoxylates).

For the preservative use could be made of BIT or MIT (benzisothiazolinone or methylisothiazolinone).

For the antifoaming agent use could be made of polyether siloxane copolymer.

Preferably, the paper obtained with the method of the invention is provided with thermosetting resin, such as melamine resin, preferably after providing it with a printed pattern by means of inkjet printing. For this reason, preferably the paper layer is only provided with an inkjet receiver coating at one side thereof, namely at the side provided to be printed upon. The other, opposite side, is preferably untreated, such that this opposite side shows the original porosity of the paper layer from which it is started. The resin may then be provided substantially from the bottom side into the papers core. To allow sufficient impregnation of the paper having the inkjet receiving coating, the speed of the impregnation channel may be tuned down, the resin may be made less viscous, the impregnation may be pressurized and/or the resin may be heated, e.g. to between 45 and 85° C.

Generally, it is noted that, although the paper obtained with the method of the invention is printable with an inkjet printer, it is not excluded that the paper eventually is printed using other techniques, such as rotogravure or offset printing. Also in such case, the diminished dust release and the potentially better printing quality is of interest. This is especially the case when aqueous inks are being used.

Preferably, said first and/or second composition is a liquid substance which is deposited on said paper layer, and is preferably forcibly dried e.g. in a hot air oven or by means of infrared or near infrared light or by means of microwave drying. Preferably at least such a drying operation takes place in between said partial steps of the first aspect of the invention. Preferably the liquid substance is a water based suspension of at least said binder, and possibly said pigments. Preferably the first composition has a dry matter content of 8 to 25 percent by weight of the liquid substance. Preferably the second composition has a dry matter content of 4 to 20 percent by weight of the liquid substance. Preferably the dry matter content as expressed by weight percentage is higher in the first composition than in the second composition.

The deposition of said liquid substance of the first and/or second composition can be obtained in any way, possibly by means of printing, e.g. inkjet printing, but preferably by means of coating techniques, such as roller coating, spraying, metering rolls, bead coating, scattering, slot die coating. With the latter techniques preferably a coating is obtained that covers at least 80% of the surface of the paper layer. Preferably an excess of the liquid substance is firstly applied to the paper layer, and afterwards the excess material is taken off again, e.g. squeezed off, until the desired weight is obtained. Inline measurement systems may be desirable to steer and control the weight of the inkjet receiver coating. Such technique brings down the risk of obtaining uncoated areas of the paper, which could lead to local flaws in the printed pattern. A preferred equipment for application of the liquid substance is a coating device comprising reverse metering rollers. Such rollers may create a smooth coating surface.

The deposition of the liquid substance for the first and/or the second composition may be performed in an impregnation channel or, alternatively, on the printing equipment, immediately before the printing operation. This last case solves any possible issues with limited shelf life of the inkjet receiver coating. Preferably the deposition of the liquid substance is performed while the paper is still in an "endless" shape, namely taken from the roll without cutting. Such techniques allow for a more uniform application of the inkjet receiver coating. In the case the coating is wholly or partially done on the printing equipment, the printing equipment is preferably a roll-to-roll or a roll-to-sheet printer, comprising a coating device upstream of the print heads, for example a roller coater and/or additional printing heads suitable for printing the liquid substance for the respective sublayer of the inkjet receiver coating. Such additional printing heads, for example an additional row of printing heads, may have nozzles with a larger diameter than those used for the actual printing of the pattern. A resolution of 1 to 100, or even 1 to 25 dots per inch may suffice for these nozzles. The larger diameter allows for the jetting of more viscous substances. According to a special embodiment, said first layer is applied to the paper using rollers, while the second layer is applied using such additional printing heads. Such an embodiment is especially interesting when the pigment to binder ratio in said second composition is low, i.e. below 2:1. In such case the liquid substance for said second layer will be more easy to apply with said additional print heads.

Said liquid substance for said first and/or second composition preferably shows a viscosity of 10 to 75 seconds Din cup 4 at 20° C. Such property allows for a straightforward application of the liquid substance to the surface of the paper layer. In experiments, a solid content of about 12% and viscosity of about 24 seconds yielded a sufficiently uniform coating on a previously untreated paper layer, e.g. when applied by means of a roller coater.

According to a variant, and an independent inventive method, instead of a paper layer, a thermoplastic foil, such as polyvinylchloride (PVC) foil, polypropylene (PP) foil, polyethylene (PE) foil, polyethylene-terephthalate (PET) foil or thermoplastic polyurethane (TPU) foil is treated with an inkjet receiver coating using two partial coating steps. Therefore, the present invention, in accordance with a second independent aspect thereof, relates to a method for manufacturing thermoplastic foil printable with an inkjet printer for use as a decor foil in a laminated panel, wherein the method at least comprises the following steps:

the step of providing a thermoplastic foil;

the step of coating at least one side of said thermoplastic foil with an inkjet receiver coating comprising pigment and binder;

with the characteristic that said inkjet receiver coating is applied in at least two partial steps, wherein respectively a first layer with a first composition and, subsequently, a second layer is applied with a second composition, both compositions at least comprising said binder. Generally, the same first and second compositions as described above in connection to the treatment of paper layers, may be used in this second aspect of the invention. The preferred binder for use on such foils is polyurethane based, acrylate based or polyvinyl acetate based. Further the binder content in the first composition may be somewhat reduced as compared to the treatment of paper layers since less absorption into the core of the layer is expected. Preferably the pigment to binder ratio in the first composition is in such case between 1:1 and 6:1.

It is clear that the present invention also relates to paper layers and thermoplastic foils that are obtained using the methods of the first, respectively the second aspect of the present invention.

With the same aim as in said first aspect, according to a third independent aspect, the invention also relates to a paper for inkjet printing, wherein said paper at least at one side is provided with an inkjet receiver coating comprising at least pigment and binder, with as a characteristic that the portion of free or unbound pigment is less than 10 weight percent of the total amount of pigment in said inkjet receiver coating and/or in that said inkjet receiver coating is substantially free of pigment at its surface. Such paper may be obtained using the method of the first aspect of the invention, though not necessarily. It is clear that such paper layer may further show features identical to features inherent to paper layers obtained using the method of the first aspect.

With the same aim as in said first aspect, according to a fourth independent aspect, the invention also relates to a paper for inkjet printing, wherein said paper at least at one side is provided with an inkjet receiver coating comprising at least pigment and binder, with as a characteristic that said inkjet receiver coating at its surface is substantially formed by said binder. Such paper may be obtained using the method of the first aspect of the invention, though not necessarily. It is clear that such paper layer may further show features identical to features inherent to paper layers obtained using the method of the first aspect.

The invention also relates to thermoplastic foils showing the characteristics of the third and/or fourth aspect of the invention.

The invention further, in accordance with its fifth independent aspect, relates to a method for manufacturing a laminate panel, wherein said panel at least comprises a substrate material and a provided thereon top layer with a printed decor, wherein said top layer is substantially formed from thermosetting resin and one or more paper layers, wherein said paper layers comprise a decor paper on the basis of a paper for inkjet printing in accordance with the third and/or fourth independent aspect and/or obtained by means of a method in accordance with the first independent aspect and/or the preferred embodiments of these aspects. In accordance with its sixth independent aspect, the invention also relates to a method for manufacturing a laminated panel, wherein said panel at least comprises a substrate material and a provided thereon top layer with a printed decor, wherein said top layer is substantially formed from thermoplastic material including one or more thermoplastic foils, wherein said thermoplastic foils comprise a decor foil on the basis of a thermoplastic foil for inkjet printing obtained by means of a method in accordance with the second independent aspect and/or the preferred embodiments of this second aspect.

Preferably, in said fifth aspect, the paper for inkjet printing is printed by means of an inkjet printer, is impregnated with an amount of said thermosetting resin and is attached to said substrate material by means of a hot pressing treatment. Preferably, in said sixth aspect, the thermoplastic foil for inkjet printing is printed by means of an inkjet printer and is attached to said substrate material by means of a hot pressing treatment. Preferably, said inkjet printer operates on the basis of water-based inks, wherein, more particularly, an inkjet printer of the single-pass type and/or an inkjet printer operated in single-pass mode is preferred. Single-pass printing operations show valuable synergistic effects with the treated paper or treated thermoplastic foils of the invention. The reduced dust release from the treated layers minimizes the risk of nozzle clogging in the inkjet printer. Clogged nozzles in single-pass printing operations are particularly cumbersome since they lead to defects in the printed pattern, i.e. so-called missing nozzles, which defects can generally not be hidden or masked by subsequent printing operations, as is the case with multi-pass operated or plotting printers. Missing nozzles in single-pass operated equipment may still be masked by creating redundancy in the printer, e.g. by putting two or more single-pass operated printers in series, which is extremely expensive. The present invention is therefore extremely valuable in operations using single-pass printing and leads to a manufacturing method which is fluent and less prone to printing defaults.

With the same aim as in the previous aspects of the invention, the invention, in accordance with its seventh aspect, relates to an equipment for manufacturing paper and/or thermoplastic foils in accordance with any of the previous aspects or for use in a method in accordance with any of the previous aspects, with as a characteristic that said equipment comprises at least two separate coaters for applying said inkjet receiver coating in separate partial steps. Preferably said equipment further comprises an inkjet printer, preferably an inkjet printer of the single-pass type, or an inkjet printer allowing an operation in single-pass mode.

As is made clear in the fifth independent aspect of the invention, the paper layer having the inkjet receiving layer of the invention may be used in a method for manufacturing panels having a decorative surface, wherein said panels at least comprise a substrate and a top layer comprising thermosetting resin, wherein said top layer comprises a paper layer having a printed pattern, with as a characteristic that for providing said portion of said printed pattern use is made of pigment containing inks deposited on said paper layer by means of a digital inkjet printer, and in that the dry weight of the total volume of said pigment containing inks deposited on said paper layer is 9 grams per square meter or lower, preferably 3 to 4 grams per square meter or lower, wherein for said pigment containing ink use is made of a water based or so-called aqueous ink. The limitation of the dry weight of the applied ink leads to a layer of ink that lowers the risk of pressing defects and splitting in the top layer. Indeed, possible interference between the ink layer and the thermosetting resin during the pressing operation is limited. Because the ink load is limited to a maximum of 9 grams per square meter, wrinkling or expansion of the paper due to the ink can be brought to an acceptable level, which assures stable further processing. Preferably for said pigment containing ink use is made of organic pigments. Organic pigments are known to be more stable when exposed to sunlight, or other sources of UV radiation. Preferably said pigments of said pigment containing ink have an average particle size of less than 250 nanometer. Preferably said dry weight of deposited pigmented ink is 5 grams per square meter or less, for example 4 or 3 grams per square meter or less. Preferably the printed pattern is entirely, or at least essentially, made up of such pigmented ink, wherein the printed pattern covers the majority, and preferably 80 percent or more of the surface of said paper layer. Preferably said total volume of deposited pigment containing ink is less than 15 milliliter, or even better less than 10 milliliter or still less, e.g. 5 milliliter or less.

Preferably, the paper layer of the invention is opaque and/or contains titanium oxide as a whitening agent.

Preferably the printed pattern applied to the paper layer of the invention, covers the majority, and preferably 80 percent or more of the surface of said paper layer Preferably said paper layer is, before or after printing, and before or after application of the inkjet receiver coating, provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

Preferably the paper layer is, before or after printing, and before or after application of the inkjet receiver coating, provided with such an amount of thermosetting resin, that at least the paper core is satisfied with the resin. Such satisfaction can be reached when an amount of resin is provided that corresponds to at least 1.5 or at least 2 times the paper weight. It should be clear that the resin which is provided on the paper layer, is not necessarily only available in the core of the paper, but may form surface layers on both flat sides of the paper. The inkjet receiver coating may then be present on the surface of the paper with the intermediary of such a surface layer of thermosetting resin. According to a special embodiment, the paper layer is firstly impregnated through or satisfied, and, afterwards, at least at the side thereof to be printed, resin is partially removed and possibly said inkjet receiver coating is provided.

Preferably the resin provided on said paper has a relative humidity lower than 15%, and still better of 10% by weight or lower while printing.

Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer.

Preferably said thermosetting resin is a melamine based resin, more particularly a melamine formaldehyde resin with a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapor bubbles to the surface, however the present invention provides measures for limiting such hindrance. The inkjet receiver coating is beneficial in this regard as it may provide for an additional buffer for capturing such escaping vapor. When making use of an inkjet receiver coating which is porous and/or hydrophilic, which is the case when using e.g. silica and/or polyvinyl alcohol, some of the water vapor originating upon curing the thermosetting resin of the paper layer in the press may be taken up by this coating, such that the process is less prone to the origination of pressing defects, such as locked in water vapor bubbles. Other examples of such thermosetting resins leading to a similar polycondensation reaction include ureum-formaldehyde based resins and phenol-formaldehyde based resins.

Preferably the paper layer is only impregnated with resin after application of the inkjet receiver coating and after printing. In this way the inkjet receiver coating is not at all effected by the water contained in the water-resin mixture applied for impregnation purposes.

As is clear from the above, the method of the fifth aspect of the invention preferably comprises the step of hot pressing the printed and resin provided paper layer, at least to cure the resin of the obtained resin provided decor paper. Preferably the method of the invention forms part of a DPL process as above described, wherein the printed resin provided paper layer of the invention is taken up in the stack to be pressed as the decorative layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

Preferably a further resin layer is applied above the printed pattern after printing, e.g. by way of an overlay, i.e. a resin provided carrier layer, or a liquid coating, preferably while the decor layer is laying on the substrate, either loosely or already connected or adhered thereto.

The paper layer of the invention may be a colored, pigmented and/or dyed base paper. The use of a colored and/or dyed base paper enables further limiting the dry weight of deposited ink for attaining a particular pattern or color. Preferably the dye or pigment is added to the pulp before the paper sheet is formed. According to an alternative the ink receiving layer on said paper layer to be printed is colored or pigmented with colored pigments. In accordance with the general disclosure, however, the pigments contained in the inkjet receiver coating are preferably colorless or white.

Preferably for printing the paper layer of the invention, a digital inkjet printer is applied that allows to jet ink droplets with a volume of less than 50 picoliters. The inventors have found that working with droplets having a volume of 15 picoliters or less, for example of 10 picoliters, brings considerable advantages regarding the limitation of dry weight of deposited inks. Preferably a digital inkjet printer is applied that allows to work with ink droplets of several volumes in one and the same print, or with so-called halftone or gray scale. The possibility of half tone or gray scale printing enables further limitation of the dry weight of deposited ink while maintaining an excellent print definition. Preferably a digital inkjet printer is applied that allows to attain a definition of at least 200 dpi, or even better at least 300 dpi (dots per inch). Preferably said digital inkjet printer is of the single pass type, wherein the paper layer is provided with said printed pattern in a single continuous relative movement of the paper layer with respect to the printer or print heads. It is not excluded that other digital inkjet printers are used to put the invention into practice, such as so called multi-pass or plotter type printers. With printers of the single pass type, as well as with printers of the multi pass type the print heads preferably extend over the entire width of the paper to be printed. This is not the case with a plotter arrangement, wherein the print heads need to perform a scanning motion in the width direction of the paper layer. Such printers are however not excluded from being applied in the method of the invention. It is noted that printers of the multi-pass type have the advantage that any failing nozzle can be hidden by the print of a subsequent pass. In this type of printers the nozzles can be shifted somewhat in between passes, such that on a particular location of the paper dots are printed by several nozzles. With a multi-pass equipment, or even with a plotter it is possible to perform automatic maintenance or cleaning in between subsequent passes, when needed. The issue with failing nozzles is especially relevant when water based or so-called aqueous pigment containing inks are being used. Indeed, nozzles can get clogged by the ink pigment because the water has dried up. The risks of failing nozzles is lower e.g. with UV curable inks. Also, when an inkjet receiver coating is used, normally, the risk of failing nozzles may rise. However the dual layer application of the inkjet receiver coating in accordance with the first aspect of the present invention enhances the time of autonomous production due to a diminished dust release.

It is clear that, according to the most preferred embodiment of the present invention, the paper layer, while printing, is still flexible and that the paper layer is only attached or put on the plate shaped substrate after printing. According to a variant the paper layer is already attached or loosely laid on the plate shaped substrate while printing. The possible attachment with the substrate can be reached by means of urea based, phenol based, melamine based, polyurethane based glues and similar adhesives. Such attachment can be attained by means of a pressing treatment, whether or not a heated press treatment.

Preferably, the method of the fifth aspect of the invention further comprises the step of applying a counter layer or balancing layer at the surface of the substrate opposite the printed paper layer. The counter layer or balancing layer preferably comprises a paper layer and thermosetting resin, preferably the same resin as the top layer.

Preferably the mutual adherence of the plate-shaped substrate, the possible counter layer and the possible transparent or translucent layer is obtained in one and the same press treatment. According to the most preferred embodiment, the steps of the fifth aspect of the method of the invention are taken up in a DPL process.

According to the most important example of the invention, a standard printing paper, like the one used for rotogravure, having a weight between 60 and 90 grams per square meter is provided with an inkjet receiver coating in accordance with the first aspect of the invention, and is printed with a wood pattern using a digital inkjet printer with aqueous pigmented inks. Subsequently the printed paper layer is provided with melamine resin by means of a standard impregnation channel; namely by means of roller, immersion, jetting and/or spraying equipment. The resin provided paper layer is then dried until a residual humidity of less than 10%, preferably about 7%, is reached. A stack is formed of a resin provided counter layer, a plate shaped substrate, the printed resin provided paper layer and a resin provided paper layer forming a so-called overlay. The stack is then pressed during less than 30 seconds at a temperature of about 180-210° C. and a pressure of more than 20 bar, for example 38 bar. While pressing the surface of the stack contacts a structured press element, such as a structured press plate, and a relief is formed in the top layer of the obtained laminate panel. Possibly the obtained relief can be formed in register with the printed pattern of the resin provided paper layer.

It is further clear that the paper obtained in the first aspect of the invention is suitable for use as a decor paper in a method for manufacturing floor panels, furniture panels, ceiling panels and/or wall panels.

It is clear that the printed pattern, the plate-shaped substrates and the paper layers mentioned above may have to be divided during the methods of the invention for obtaining their respective final dimensions. The panels obtained by means of a DPL press treatment or similar are preferably sawn or otherwise divided. Other treatments of the obtained panels are of course not excluded.

BRIEF DESCRIPTION OF THE DRAWINGS

With the intention of better showing the characteristics according to the invention, in the following, as an example without limitative character, an embodiment is described, with reference to the accompanying drawings, wherein.

DESCRIPTION OF NON-LIMITING EMBODIMENTS

Figure 1:
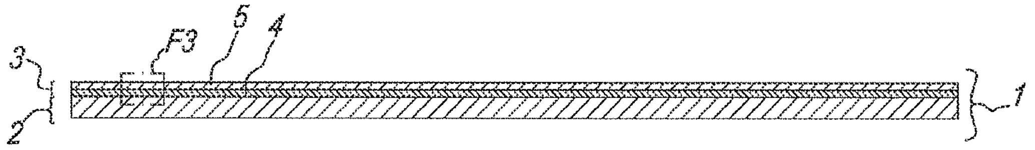
FIG. 1 schematically shows an embodiment of a paper layer that has been provided with an inkjet receiving coating in accordance with the method of the first aspect of the invention.

FIG. 1 schematically illustrates a treated paper layer 1 that is printable with an inkjet printer. The printable paper layer 1 comprises a paper sheet 2 provided with an inkjet receiver coating 3, that comprises a first layer 4 with a first composition and a second layer 5 with a second composition. The paper sheet 2 is, in this case, a base printing paper having a weight of about 70 grams per square meter and with a mean air resistance as expressed by Gurley value of below 30 seconds.

It is generally noted that the dimensions of the represented paper sheet 2 and the layers 4-5 is, in the figures, drawn out of scale in order to better illustrate the invention.

Figure 2:
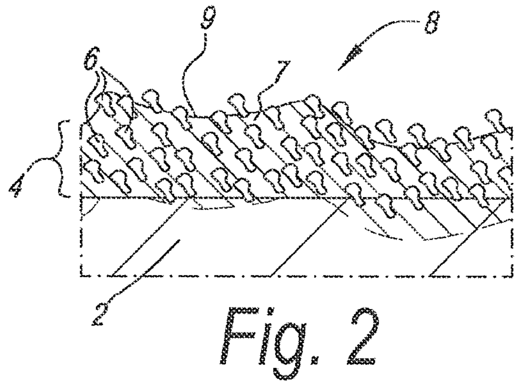
FIGS. 2 and 3 on a larger scale provide a view on the area F3 illustrated in FIG. 1, wherein, in the case of FIG. 2, only said first layer has been applied to the paper layer.
Figure 3:
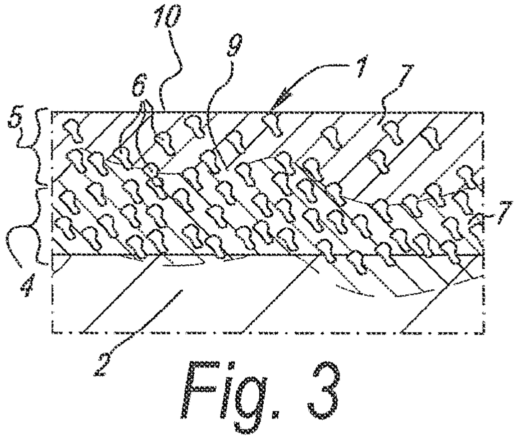

FIGS. 2 and 3 show that the inkjet receiver coating 3 comprises pigments 6 and binder 7. The composition of the first layer 4, as well as the composition of the second layer 5 both comprise binder, such in accordance with the first aspect of the invention.

FIG. 2 illustrates a halfproduct 8 wherein only the first layer 4 has been applied to the paper sheet 2. The binder 7 is partially absorbed into the paper sheet 2, and such in a non-uniform manner. At the surface 9 loose and/or badly bound pigments 6 are present. Such pigments 6 give rise to dust release upon further processing of such halfproduct 8. The obtained surface 9 of the first layer 4 also suffers from unevenness.

FIG. 3 shows the paper layer 1 wherein also the second layer 5 has been applied on top of the first layer 4. FIG. 3 shows that the second layer 5 evens out the surface 9, leading to a more uniform surface 10 of the second layer and of the paper layer 1. The composition of the second layer 5 has in this case a lower pigment to binder ratio than the composition of the first layer 4.

It is noted that FIG. 3 is an example of the third and fourth aspect of the present invention, wherein at the surface of the treated paper layer less than 10 weight percent of the total pigment 6 is unbound or free and wherein the surface 10 of the second layer is essentially, and in this case completely, formed by binder 7.

Figure 5:
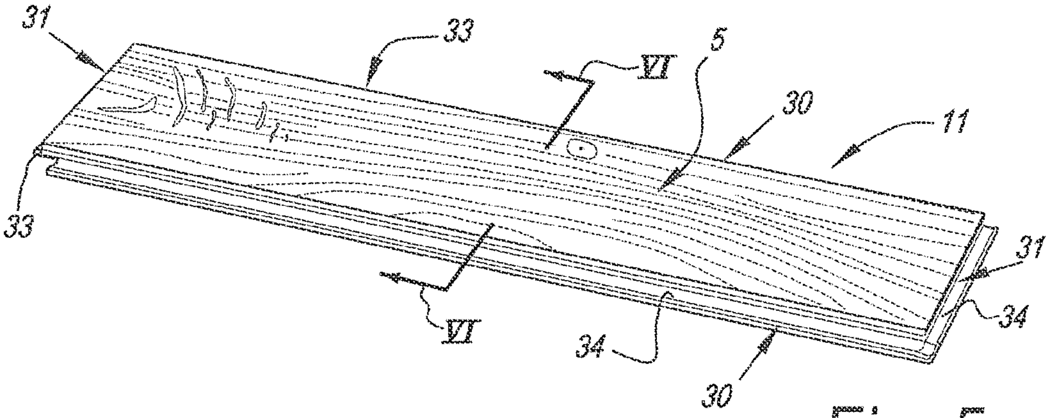
FIG. 5 shows in perspective a panel obtained by means of the method of FIG. 4.
Figure 6:
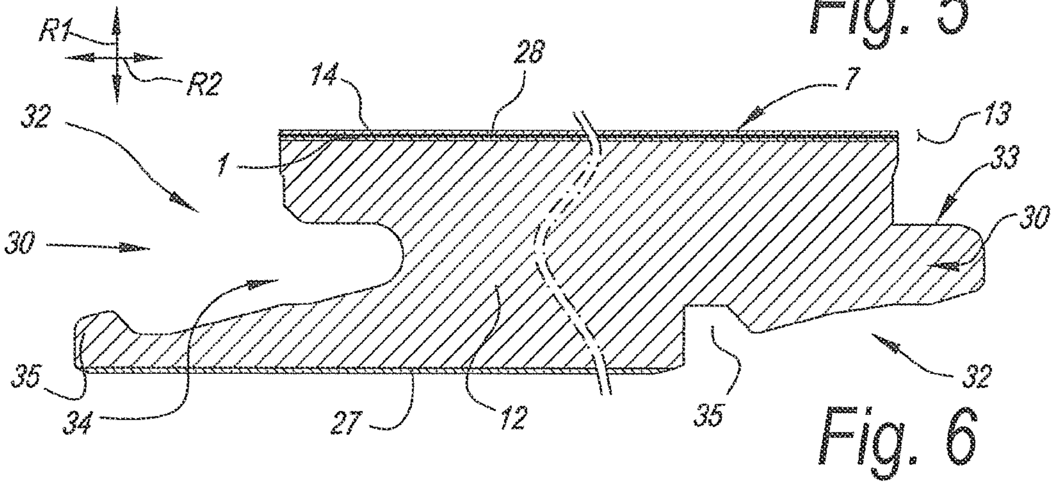
FIG. 6 shows a view according to the line VI-VI indicated on FIG. 5.
Figure 4:
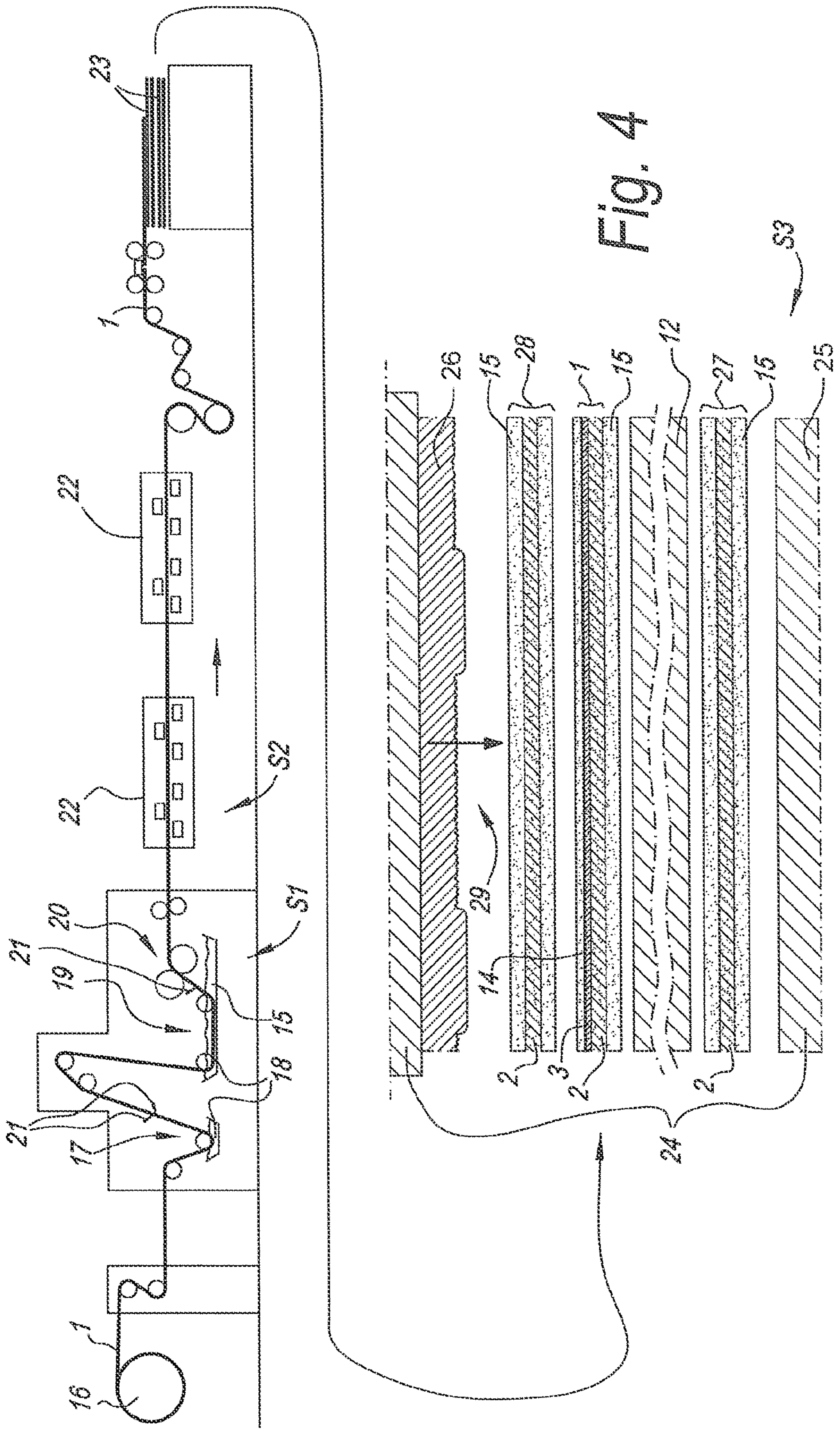
FIG. 4 shows some steps in a method in accordance with the fifth aspect of the invention.

FIG. 4 illustrates a method for manufacturing laminate panels 11 of the type shown in FIGS. 5 and 6. The method forms an illustration of the fifth independent aspect of the invention as described in the introduction of the present patent application. The obtained decorative panels 11 at least comprise a substrate 12 and a top layer 13. The top layer 13 comprises a paper layer 1, manufactured in accordance with the first aspect, and provided with a printed pattern or a digitally printed ink layer 14 representing a wood pattern, as is the case here. The method of the example embodiment comprises at least the step S1 of providing said paper layer 1 having the inkjet receiving layer and the printed pattern with thermosetting resin 15. Hereto the paper layer 1 is taken from a roll 16 and transported to a first impregnation station 17 where said paper layer is immersed in a bath 18 of said resin 15, more particularly a mixture of water and resin 15. The paper layer 1 is then allowed to rest while in this case being transported upwards. The resting allows for the resin 15 to penetrate the paper core. The paper layer 1 then comes into a second impregnation station 19 where the paper layer 1 is, in this case, again immersed in a bath 18 of resin 15, more particularly a mixture of water and resin 15. A set of squeezing rollers 20 allows to dose the amount of resin 15 applied to the paper layer 1.

In the example several doctor blades 21 are available for partially removing resin at the surface of the resin provided paper layer 1.

In a second step S2 the resin provided paper layer 1 is dried and its residual humidity level is brought to below 10%. In the example hot air ovens 22 are used, but alternatively other heating equipment can be used, such as microwave drying equipment.

FIG. 4 also illustrates that the continuous paper layer 2 is cut to sheets 23 and stacked.

FIG. 4 further illustrates that in a subsequent step S3 the obtained sheets 23 or the paper layer 1 is taken up in a stack to be pressed in a short daylight press 24 between upper and lower press plates 25-26. Said stack comprises from bottom to top a counter layer 27, a plate shaped substrate 12, the abovementioned paper layer 1 and a protective layer 28, wherein the counter layer 27 and the protective layer 28 both comprise a paper sheet 2 and resin 15. The stack is then pressed and the press treatment results in a mutual connection between the constituent layers 1-12-27-28, including the substrate 12, of the stack, as well as in a hardening or curing of the available resin 15. More particularly here a polycondensation reaction of the melamineformaldehyde resin 15 takes place, having water as a by-product.

The upper press plate 26 is a structured press plates that provides a relief in the melamine surface of the panel 1 during the same press treatment of the step S3, by bringing the structured surface 29 of the upper press plate 26 into contact with the melamine of the protective layer 28.

FIGS. 5 and 6 illustrate that the obtained decorative panel or laminate panel 11 can have the shape of a rectangular and oblong laminate floor panel, with a pair of long sides 30 and a pair of short sides 31 and having an HDF or MDF substrate 12. In this case the panel 11 is at long at least the long sides 30 with coupling means 32 allowing to lock the respective sides 30 together with the sides of a similar panel both in a direction R1 perpendicular to the plane of the coupled panels, and in a direction R2 perpendicular to the coupled sides and in the plane of the coupled panels. As illustrated in FIG. 6 such coupling means or coupling parts can basically have the shape of a tongue 33 and a groove 34, provided with additional cooperating locking means 35 allowing for said locking in the direction R2.

Figure 7:
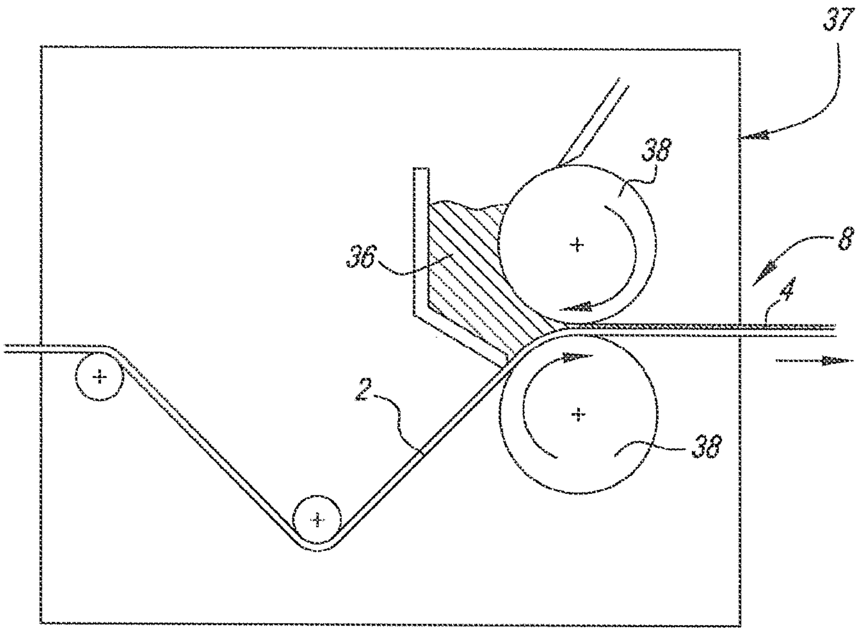
FIG. 7 shows a piece of equipment for use amongst others in the first aspect of the invention.

FIG. 7 shows that, in accordance with a preferred embodiment, at least one of the first layer 4 and the second layer 5 of the inkjet receiver coating 3, may be obtained by coating in one of said two partial steps a liquid substance 36 to the paper sheet 2. In this case, the application of the first layer is illustrated. A device 37 comprising reverse metering rollers 38 is applied. Such device 37 may initially apply an excess of the liquid substance 36, which is squeezed off to the desired weight by means of the rollers 38, which also may provide for a smooth coating surface. Preferably, the obtained halfproduct 8 is then dried, e.g. by means of a hot air oven, to reach a residual humidity level of preferably below 10%, or of about 7%. The obtained treated paper is then further treated by applying the second layer 5 of the inkjet receiver coating 3. Such is here not illustrated, but this may be executed in a fairly similar way.

Figure 8:
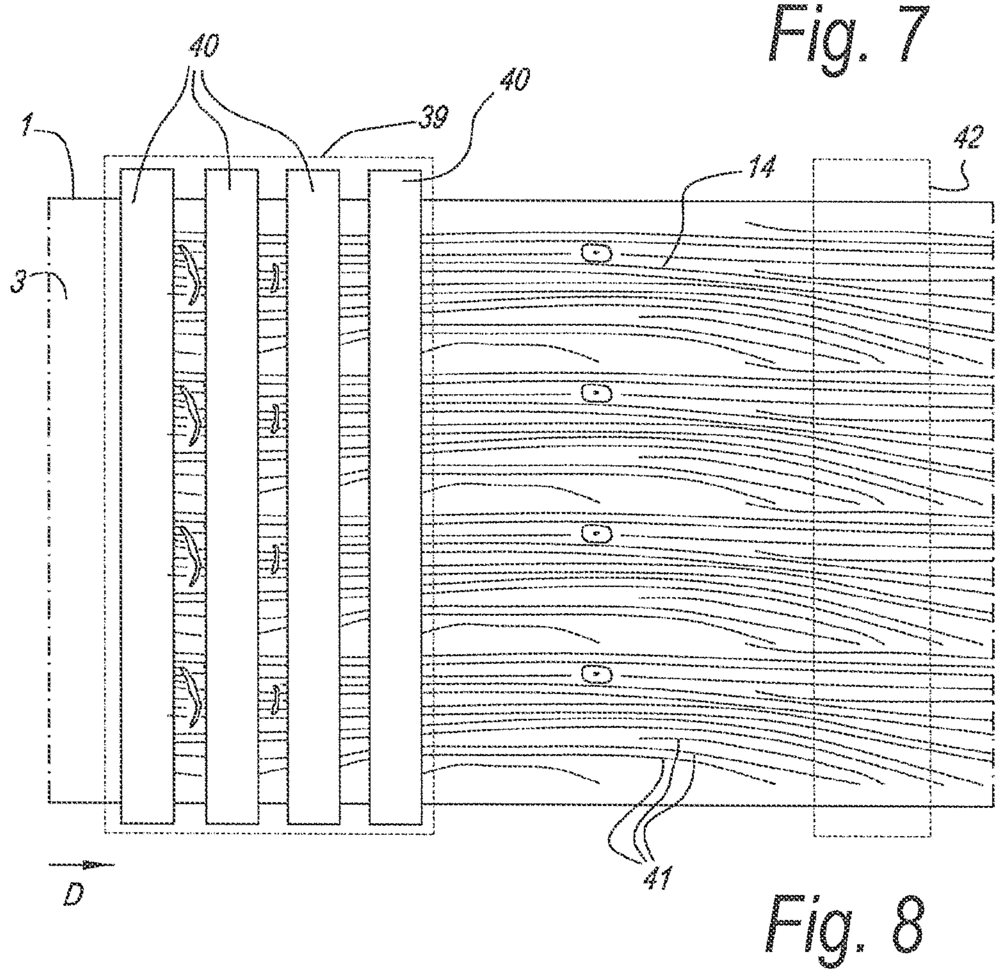
FIG. 8 schematically shows a top view on a printer operated in single-pass mode.

FIG. 8 illustrates that the paper layer 1 having the inkjet receiver coating of the first aspect of the invention may be printed by means of an inkjet printer 39, which, in this example comprises several rows 40 of print heads that extend over the area of the paper layer 1 to be printed. The printer 39, in this example, relates to a printer of the single pass type, wherein the provision of the printed pattern involves a relative motion of said inkjet printer 39, more particularly the rows 40, and said paper layer 1 during printing in a printing direction D. In this case, the rows 40 and the print heads are at standstill, while the paper layer 1 moves during ejection of inks onto the paper layer 1, more precisely onto the inkjet receiver coating 3 applied to the paper sheet. The paper layer 1 gets printed during a single continuous movement of the paper layer 1 relative the printer 39 or the rows 40 of print heads. The obtained printed pattern 14 comprises, in the example, a wood motif having wood nerves 41 extending generally in the printing direction D. Preferably a drying station 42 is provided downstream of the printer 39. After drying the inks, the printed paper layer is preferably rolled up and used in the method illustrated in FIG. 4 as the roll 16.

The present invention is in no way limited to the above described embodiments, but such methods, equipment, paper layers and thermoplastic foils may be realized according to several variants without leaving the scope of the invention.

What is claimed is:

1. A composition for use in a method for manufacturing a paper layer printable with an inkjet printer, wherein the paper layer is for use as a decor paper in a laminate panel, wherein at least one side of the paper layer is coated with an inkjet receiver coating in at least two partial steps, wherein respectively a first layer of a first composition is applied, and subsequently a second layer of a second composition is applied;

wherein the first and the second compositions at least comprise a binder;

wherein each of the first and the second compositions is a liquid substance being a water-based suspension of at least the binder;

wherein a dry matter content of the first composition is of 8 to 25 percent by weight of the liquid substance, and/or wherein a dry matter content of the second composition is of 4 to 20 percent by weight of the liquid substance;

wherein the first and the second compositions include silica particles as pigment, and the binder is polyvinyl alcohol;

wherein the first composition and the second composition have a different pigment to binder ratio; and wherein the first composition has a pigment to binder ratio which is larger than the pigment to binder ratio of the second composition.

2. The composition according to claim 1, wherein the dry matter content as expressed by weight percentage is higher in the first composition than in the second composition.

3. The composition according to claim 1, wherein the first layer and the second layer differ in that an average particle size of the pigments contained in the first composition is larger than an average particle size contained in the second composition.

4. The composition according to claim 1, wherein the pigment to binder ratio in the second composition is lower than 2.

5. The composition according to claim 1, wherein the pigment to binder ratio in the first composition is larger than 3.5.

6. The composition according to claim 1, wherein the first composition has a pigment to binder ratio which is at least 20% larger than the pigment to binder ratio of the second composition.

7. The composition according to claim 3, wherein the larger pigment particles are contained in the first composition.

8. The composition according to claim 7, wherein the pigment particles in the first composition have an average particle size between 1 and 20 micrometer.

9. The composition according to claim 7, wherein the pigment particles in the second composition have an average particle size between 100 nanometer and 1 micrometer.

10. The composition according to claim 1, wherein the first composition and/or the second composition includes an inorganic pigment.

11. The composition according to claim 1, wherein the first and the second compositions include amorphous and/or precipitated silica as pigment.

12. The composition according to claim 1, wherein the first and the second compositions include pigments that have an average particle size of 100 nm to 20 μm.

13. The composition according to claim 1, wherein the first and the second compositions include pigments that have an average surface area of 20 to 420 $m^2/g$.

14. The composition according to claim 1, wherein the first and the second compositions include pigments that have an average pore volume of 0.5 to 2 ml/g.

15. The composition according to claim 1, wherein the first and the second compositions include pigments that have an average particle size between 2 and 7 μm, an average surface area of 300 to 420 $m^2/g$, and an average pore volume between 1 and 2 ml/g.

16. The composition according to claim 1, wherein the first composition and/or the second composition comprises a cross-linker.

17. The composition according to claim 16, wherein the cross-linker is chosen from the group consisting of aldehydes, aziridines, isocyanates, epoxides, and borates.

* * * * *